No. 80,642. PATENTED AUG. 4, 1868.
W. L. LOWREY.
MANUFACTURE OF ILLUMINATING GAS.
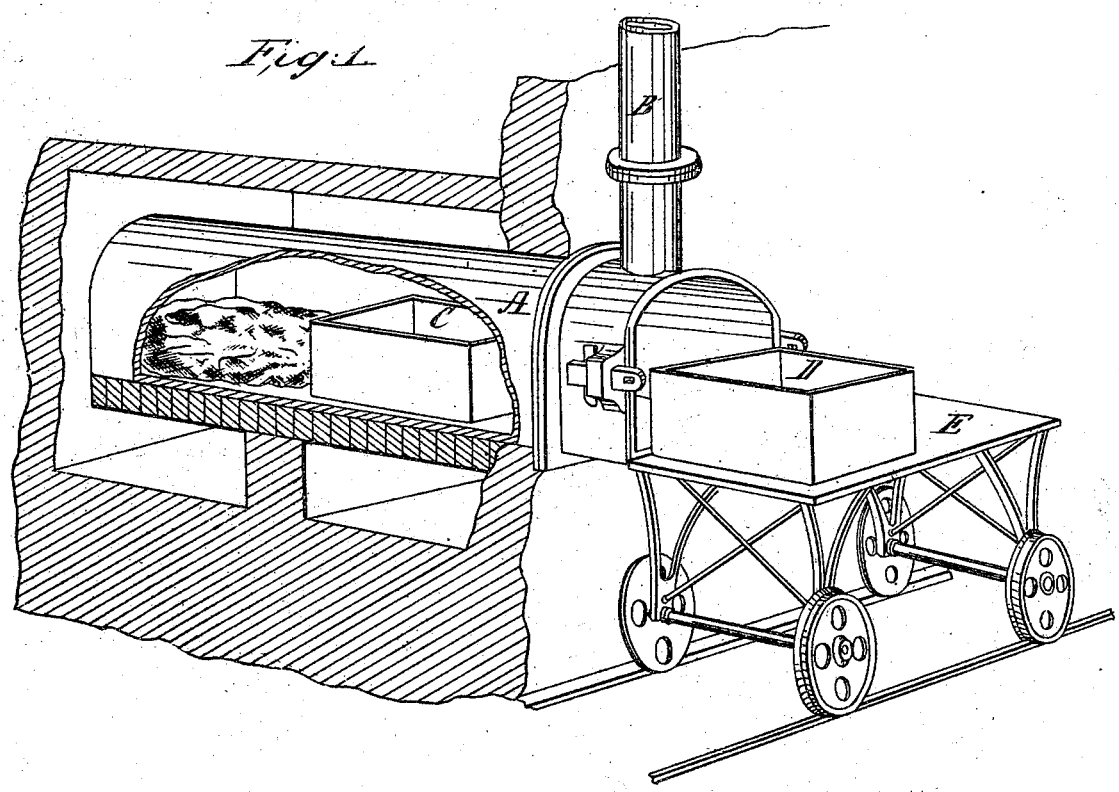
Witnesses.
P. T. Dodge
Jno. Johnson
Inventor
W. L. Lowrey
by Dodge & Munn
his attys

United States Patent Office.

WILLIAM L. LOWREY, OF SARATOGA SPRINGS, NEW YORK.

Letters Patent No. 80,642, dated August 4, 1868.

IMPROVEMENT IN THE MANUFACTURE OF ILLUMINATING-GAS.

*The Schedule referred to in these Letters Patent and making part of the same.*

TO ALL WHOM IT MAY CONCERN:

Be it known that I, WILLIAM L. LOWREY, of Saratoga Springs, in the county of Saratoga, and State of New York, have invented certain new and useful Improvements in the Manufacture of Illuminating-Gas; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to the manufacture of illuminating-gas, and consists in using the hydrate of lime and coal-tar, in a novel manner within the retort, or of using the hydrate of lime and other substances, as hereinafter mentioned, for the purpose of producing illuminating-gas in large quantities and at small cost.

In the drawings—

Figure 1 is a perspective view of one of a bench of retorts, with its side broken away to show its interior, and also the railway and carriage used for convenience in charging it.

Figures 2 and 3 are views of transverse sections of the pots or receptacles used in charging the retorts.

It is well known that gas-engineers and other persons have for a long time been experimenting to discover some effective process for distilling gas from coal-tar, but owing to the fact that the heat necessary for distilling gas causes the coal-tar to distil over before being converted into a fixed gas, and to clog up the stand-pipes with soot, their experiments have not, so far as I know, been successful. In my experiments I have discovered a process which overcomes these difficulties, and by which, with the use of hydrate of lime, I am able to get large quantities of gas from the coal-tar, as well as an improved quality. I have also discovered that the same process may be advantageously used in distilling gas from hydrocarbon-oils, resins, gums, and the residuum from the distillation of petroleum.

For distilling my gas, I use a bench of retorts, with their stand-pipes leading to the hydraulic main, constructed in the usual way. One of these retorts, A, with its stand-pipe B, is shown in fig. 1. I take a suitable pot or receptacle, C, and fill it nearly full of the hydrate of lime. I then take a similar pot, D, and fill it partially full with coal-tar. Over this coal-tar, I spread a layer, consisting of coke-dust, fine coal, peat, saw-dust, sand, or any similar material, mixed with a solution of soap or any gelatinous compound suitable for the purpose of causing either of these loose substances to adhere together, as shown in fig. 3. These pots C and D, when thus prepared, I place on the carriage E, which is then run up in front of the retort, when the pots are placed within the retort, and subjected to the heat. The mixture spread over the surface of the coal-tar keeps its temperature below that of the interior of the retort, and prevents its distillation from proceeding with the same rapidity that it would do if exposed without any protection. The distillation being thus retarded, the gas that is eliminated breaks through the covering into the chamber of the retort, where it mingles or unites with the hydrogen from the hydrate of lime, and the two pass off through the stand-pipe to the hydraulic main. In passing through the stand-pipe, the hydrogen takes up whatever soot or free carbon is found within it, which floats along with and seems to increase the volume of the gas.

In the same manner, I use the hydrate of lime, in connection with hydrocarbon-oils, resins, gums, and the residuum from the distillation of petroleum, by first placing the hydrate of lime in one pot, and the hydrocarbon-oils, resins, gums, &c., either separately, or in any desired combination, in the other, and spreading over the surface with a layer similar to the one placed on the coal-tar, and then charge the retort as before, when similar effects are produced. I use the hydrate of lime in like manner, and with similar results, in distilling gas from coal, or wood, or peat, or from any two, or all three of them combined, when placed in the retort, in the usual manner.

As the cost of the different substances from which gas may be distilled varies in different parts of the country, and as I am able by my process to use with advantage either of them, I can of course use that which is the most abundant, and thus furnish gas of a good quality at a low rate.

In all my experiments, I have found that the use of the hydrate of lime in the manner described, within the retort, in connection with the distillation of gas from either or all of the substances mentioned, increases the volume and quality of the gas, and tends to prevent the accumulation of soot and coal-tar in the apparatus. As the heat converts it into quicklime every time the pot is removed, it can be readily slaked, and thus be changed into the hydrate and used again, and this process may be carried on for a great length of time.

By the use of a pot for the coal-oil and the mixture spread over it, as well as for the hydrocarbon-oils, resins, gums, &c., and especially the residuum of petroleum, I not only secure their safe and steady distillation, but enable the operator to charge the retort, without the least danger from combustion or explosion.

Having thus described my invention, what I claim, is—

1. The process of distilling illuminating-gas from coal-tar, hydrocarbon-oils, resins, wax, and the residuum of petroleum, substantially as herein described.

2. The use of the hydrate of lime, within the chamber or retort, in the manufacture of illuminating-gas in the ordinary way, or by my process, substantially as herein-described.

WM. L. LOWREY.

Witnesses:
H. B. MUNN,
R. O. LOWREY.